United States Patent
Mathieu et al.

(10) Patent No.: US 10,621,252 B2
(45) Date of Patent: *Apr. 14, 2020

(54) METHOD FOR SEARCHING IN A DATABASE

(71) Applicant: QWANT, Paris (FR)

(72) Inventors: Eric Mathieu, Epinal (FR); Cyril March, Epinal (FR); Hanene Maghrebi, Nancy (FR); Samuel Petit, Epinal (FR); Laurent Vallar, Epinal (FR)

(73) Assignee: QWANT, Paris (FR)

( * ) Notice: Subject to any disclaimer, the term of this patent is extended or adjusted under 35 U.S.C. 154(b) by 507 days.

This patent is subject to a terminal disclaimer.

(21) Appl. No.: 15/451,739

(22) Filed: Mar. 7, 2017

(65) Prior Publication Data

US 2017/0185688 A1 Jun. 29, 2017

Related U.S. Application Data

(63) Continuation of application No. 13/907,039, filed on May 31, 2013, now Pat. No. 9,626,439.

(30) Foreign Application Priority Data

May 31, 2013 (FR) .................................. 13 54971

(51) Int. Cl.
| | | |
|---|---|---|
| *G06F 16/9535* | (2019.01) | |
| *G06F 16/248* | (2019.01) | |
| *G06F 16/28* | (2019.01) | |
| *G06F 16/532* | (2019.01) | |
| *G06F 16/951* | (2019.01) | |
| *G06F 16/2453* | (2019.01) | |
| *G06F 16/2457* | (2019.01) | |

(52) U.S. Cl.
CPC ........ *G06F 16/9535* (2019.01); *G06F 16/248* (2019.01); *G06F 16/2453* (2019.01); *G06F 16/24575* (2019.01); *G06F 16/24578* (2019.01); *G06F 16/285* (2019.01); *G06F 16/532* (2019.01); *G06F 16/951* (2019.01)

(58) Field of Classification Search
CPC .................. G06F 3/0481; G06F 16/954; G06F 16/90335; G06F 16/353; G06F 16/3326; G06F 16/367; G06Q 10/107
See application file for complete search history.

(56) References Cited

U.S. PATENT DOCUMENTS

| | | | | |
|---|---|---|---|---|
| 2002/0087528 A1* | 7/2002 | Lee | ..................... | G06F 16/5838 |
| 2002/0161752 A1* | 10/2002 | Hutchison | ............. | G06F 16/954 |
| 2003/0233418 A1* | 12/2003 | Goldman | ............. | G06Q 10/107 |
| | | | | 709/206 |

(Continued)

*Primary Examiner* — Etienne P Leroux
(74) *Attorney, Agent, or Firm* — Patshegen IP LLC; Moshe Pinchas

(57) ABSTRACT

The present disclosure relates to a method for searching in a database containing at least one set of objects each linked to at least one descriptor, the search being done by a search engine from at least one request by a user in order to return at least one result object. The request includes at least one search parameter having a series of at least one search element obtained by freely adding elements to the series by the user, the addition step being able to be repeated multiple times until a search instruction is given.

15 Claims, 1 Drawing Sheet

(56) References Cited

U.S. PATENT DOCUMENTS

| | | | |
|---|---|---|---|
| 2004/0236769 A1* | 11/2004 | Smith .................... | G06F 3/0481 |
| 2006/0047632 A1* | 3/2006 | Zhang .................... | G06F 16/367 |
| 2008/0059453 A1* | 3/2008 | Laderman ............ | G06F 16/3326 |
| 2011/0173186 A1* | 7/2011 | Morscher .............. | G06F 16/353 |
| | | | 707/722 |
| 2011/0314012 A1* | 12/2011 | Kenthapadi ....... | G06F 16/90335 |
| | | | 707/731 |

* cited by examiner

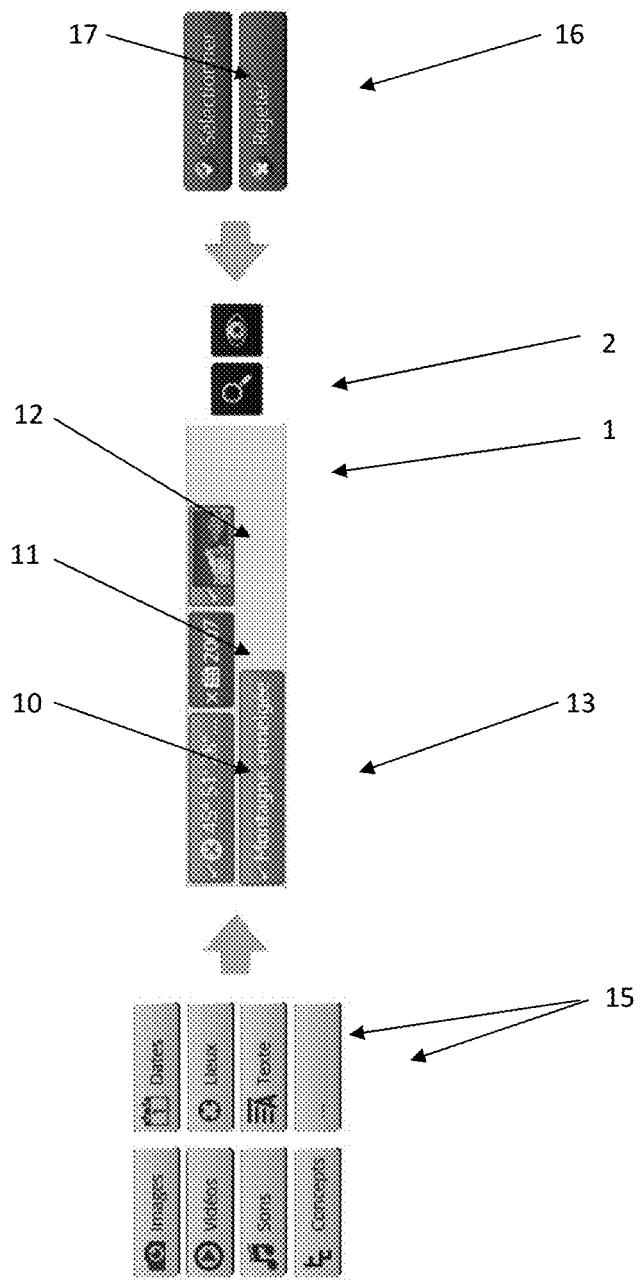

METHOD FOR SEARCHING IN A DATABASE

CROSS-REFERENCE TO RELATED APPLICATIONS

This application is a continuation of U.S. application Ser. No. 13/907,039, filed on May 31, 2013, which claims the benefit of FR 13/54971, filed on May 31, 2013. The disclosures of the above applications are incorporated herein by reference in their entirety.

FIELD

The present disclosure relates to a method for searching a database.

BACKGROUND

The statements in this section merely provide background information related to the present disclosure and may not constitute prior art.

The development of digital technologies in recent years, accompanied by the development of networks and the Internet, has led to a very significant increase in the quantity of available digital content.

One particularly significant example is the development of digital photography, in particular due to the development of online photo posting and sharing sites. Thus, as of September 2010, one of the leaders among these types of sites has exceeded 5 billion photos put online and is continuing to put thousands more online each day.

These digital objects are generally inventoried in databases combined with keywords and/or other technical descriptors (name, location, size, resolution, etc.). These keywords and descriptors make it possible to perform searches in the database and return the objects whose keywords correspond to the search criteria entered by the user in a search field.

However, currently, most search engines are primarily designed to look for text within webpages or files, and in particular in associated descriptive texts.

In the case where the stored objects are not textual in nature, for example such as photos, the associated keywords and descriptors take on considerable importance to make it possible to perform an effective search and return relevant results.

Many search engines exist to perform such searches, and many algorithms have been developed in order to optimize the relevance of the results of the searches.

Despite improved algorithms, a keyword search has intrinsic limitations, for example in particular due to the existence in human language of synonyms, homonyms, hierarchy within terms, and degrees of precision. Due to these limitations, the specific intention of the user's search beyond the first meaning of the keywords used remains unknown to the search engine.

In order to offset these limitations, most search engines allow users to perform an advanced search, in particular by using several keywords combined with each other by logic operators.

Such a search method is not, however, particularly easy for users and may, on some search engines, even go so far as to require quasi-programming skills to write a request, while not knowing whether that request may be correctly interpreted by the engine and lead to the desired result.

Various systems exist making it possible to facilitate the user's task and optimize searches.

Application WO 2012/127168 thus targets a method for refining search results providing a first response to this problem.

It should, however, be noted that the method covered by document WO 2012/127168 refines the results of a prior search, i.e., performs a sort, but the initial request step itself is not optimized. This is therefore a lost optimization step.

Furthermore, the elements eliminated during the initial request step and not returned in the initial results are not taken into account during refining and will not be able to be reintegrated into the results if necessary.

Thus, there is also a need to optimize the initial request step of a method for searching for objects in a database.

To that end, the system developed by Google is for example known for its image search service, which makes it possible to launch a search from a digital image before performing complementary searches by associating one or more keywords with it.

However, the search system only takes into account a single image that must first be added before any keywords.

Changing the image restarts the search and erases the keywords previously added.

Furthermore, adding an image automatically launches the first search based on the image alone. The keywords subsequently added will make it possible to refine the selection.

SUMMARY

The present disclosure relates to a method for searching in a database containing at least one set of objects each linked to at least one descriptor, the search being done by a search engine from at least one request by a user in order to return at least one result object, said search method being characterized in that the request comprises at least one search parameter comprising a series of at least one search element obtained by freely adding elements to said series by the user, the addition step being able to be repeated multiple times until a search instruction is given.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawing, in which:

FIG. 1 is a schematic view of one form described of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to a method for searching in a database containing at least one set of objects each linked to at least one descriptor, the search being done by a search engine from at least one request by a user in order to return at least one result object, said search method being characterized in that the request comprises at least one search parameter comprising a series of at least one search element obtained by freely adding elements to said series by the user, the addition step being able to be repeated multiple times until a search instruction is given.

Freely adding elements means that the elements are not selected from among a list of predefined elements in a request form, but are outside the request form. More concretely, a selection box (of the <select> type for an HTML form, for example) does not allow the free addition of elements, even when several elements can be selected, the selected elements necessarily having to be chosen from a list of predefined choices.

Of course, this does not exclude presenting the user with a list of elements outside the form strictly speaking, but the user remains free to select or not select from that list.

For example, a set of themes associated with corresponding descriptors may be presented to the user, in particular in the form of icons, allowing the user to initiate the search more easily.

The series of elements may be sent to the search engine using any means. It may in particular be sent within one or more variables in the form of a table or a string of characters whereof the elements (or their identifiers) are separated by a specific character (for example a semicolon ";" or a comma ",", as in files of the "comma separated values" (CSV) type). The nature or separating means for the elements must be unique and make it possible to discriminate between elements.

Thus, the space character cannot be considered discriminating and a sentence cannot automatically be considered a series of words, as it does not make it possible to distinguish whether the user has added a word or group of words as a search element. For example, the words "magic mountain" may be added by the user as two distinct and separate elements or as a general expression, and imply a very different search context.

Thus, the addition step also refers to a discriminating action by the user validating his addition. A continuous typing of words separated by spaces thus cannot constitute several additions within the meaning of the present disclosure. In such a case, it is then possible for example to provide that the user validates his addition using the enter key.

Thus, in the example previously provided, the latter may press the enter key after each of the words "magic" and "mountain", or after having entered the complete expression "magic mountain".

In the case of object elements of the image type, it is possible to consider a drag and drop function, thereby validating the addition of the element into the series.

Of course, these user entry means essentially pertain to the graphic interface, and a computer designer may choose different presentation modes.

Thus, by implementing a series of distinct request elements performing a buffer role before sending the information to the search engine, the user can add several distinct elements to his request, if applicable from different categories or a same category, which may therefore be preprocessed separately.

Part of the combination and identification work of the elements, generally done by the search engine (proximity of the words, meaning, groupings, etc.), may thus be given directly over to the user.

Furthermore, a search engine is generally capable only of analyzing words and sentences in this way.

Using the method according to the present application, the search engine, instead of receiving a single request string to process, break down and interpret as in the prior art, will receive a series of precut distinct elements according to the user's search intention.

By allowing the direct identification of the search elements by the user, it is possible to take other types of elements into account, in particular of a non-textual nature.

As previously explained, in the case of keyword use, for example, the keywords will no longer be separated from each other by the search engine, but are separated into search elements as of the user request stage.

A user wishing to perform a search on concepts A and B, for example, will then be able to add those concepts A and B directly either as distinct elements in the series or as a unit AB if that has a meaning, and without using a request language, for example of the Boolean type where the user would be required to include operators between the two concepts.

Processing is thus facilitated and optimized, several interpretation possibilities being able to be eliminated as of the search stage and thus ensuring results closer to the actual search done by the user.

An object or element refers to any digital object that may be stored in a database. As previously stated, this may in particular involve photos, as well as audio files, video files, documents, etc.

It should be noted that, in accordance with the operating principle of a database, the referenced objects are not necessarily directly contained themselves in a recording of the database and may be referenced using their storage address or URL, for example, or any other indirect means.

It should also be noted that the descriptor term used is not limited. The descriptor term of course comprises descriptors of the keyword type, but may also involve more technical descriptors referencing textures, materials, color profiles, definition, etc. These may be semantic descriptors established from a thesaurus. The nature of the descriptors is generally not limited, and they may be adapted as a function of the objects referenced in the database(s) and searched.

Advantageously, the series comprises elements having a category chosen from among the group of keywords, expression, image, location, date, time, etc. Of course, any type of category can be considered.

According to a first alternative embodiment, a category of the element is determined during the addition of the element to said series.

Advantageously, the category is associated with said element in the series. Thus, it may also be given to the search engine with the corresponding object.

It is also possible to provide prohibited categories, in particular categories that the search engine cannot take into account.

Thus, preferably, an element belonging to at least one predetermined category considered to be unauthorized is not added to the series.

Alternatively or additionally, elements of the series may be added but then ignored, or not transmitted if they appear to be irrelevant (for instance conjunctions, articles), or not able to be processed by the engine.

According to a second alternative embodiment, a category of the element is determined subsequently by the search engine.

Preferably, the series comprises at least two elements having different categories.

Also advantageously, the series comprises at least two elements having non-textual categories, for example two images.

Preferably, the element is added to the series with at least one corresponding relevance or irrelevance indication. As for the object category, this additional information will be given to the search engine. The user may thus indicate preferences or exclusions without having to build elaborate or complex requests.

Thus, advantageously, the search engine performs the search according to all or some of the following steps:

determining, for at least some of the elements of the series, a set of associated descriptors, based on the relevance and/or irrelevance indication of the element of the series, assigning at least one weight to all or part of the descriptors of the element, calculating a resultant of the weights associated with each descriptor of the set of elements in the list, identifying, in the database, objects associated with at least part of the descriptors of the elements of the series, initializing a relevance index for at least part of the identified objects, comparing each of said selected identified objects with the result, and for each descriptor of the compared identified objects, increasing or decreasing the relevance index of the object based on the weight of that descriptor in the resultant, returning the list of selected identified objects with their corresponding relevance indexes or in order of relevance.

Thus, by using a search using the relevance and irrelevance information combined with the descriptors, it is possible to better account for the actual meaning of the search and provide a more satisfactory result. Furthermore, using such a method, it is easy for the user to perform a complex search adding or removing descriptors and keywords, intuitively and transparently.

The determination of the descriptors associated with the elements may be done using any means.

In the case of an element of the keyword type, an obvious descriptor will be the keyword itself. Using a dictionary or other means, it will, however, also be possible to account for synonyms, antonyms, and other variations.

In the case of an image, the technical descriptors may be obtained from a technical analysis of the image (colorimetry, etc.) or metadata for the file (date taken, geolocation, etc.).

An image recognition-type analysis may also make it possible to determine certain non-technical descriptors (shape and object recognition, face recognition, handwriting recognition, etc.).

Lastly, if the image is known, it is also possible to extract the descriptors from a database in which it is inventoried. This may in particular be the case for photos put online on sharing sites where they are often associated with "tags" and keywords for classification purposes.

It will also be noted that different weights may be assigned to different descriptors, in particular based on their origin, context, situation relative to all of the other descriptors. Thus, for example, the descriptors coming from a thesaurus, and therefore having a standardized, uniform and structured nature, may have more weight than descriptors of the keyword type that have been assigned by the users themselves of a photo site.

Preferably, the weights assigned to the descriptors of the elements considered to be irrelevant have a sign opposite that of the weights assigned to the descriptors of elements considered to be relevant, and more particularly minus and plus signs, respectively.

Also preferably, the absolute values of the weights assigned to the descriptors of the elements considered to be relevant and/or irrelevant are equal.

Alternatively, the weight assigned to the descriptors of the elements considered to be relevant has a different absolute value, and in particular higher, than that of the weight assigned to the descriptors of the elements considered to be irrelevant.

Advantageously, the values of the weights assigned to the descriptors of the elements considered to be relevant and/or irrelevant may be different from one element of the series to the next.

According to one particular embodiment, if results already exist from the previous search, the search instruction leads to a refining method for refining the results from among the results previously returned.

The present disclosure will be better understood in light of the detailed description that follows in reference to the appended drawing, in which the sole FIGURE is a diagrammatic illustration of a search bar for a method according to the disclosure.

As previously stated, the search method according to the present application seeks to search for objects in a database containing at least one set of objects each connected to at least one descriptor.

For example purposes, it will be considered that in the case at hand, this is a database containing photos, each photo being associated with one or more descriptors of that photo.

The search is done by a search engine from at least one request by a user.

To that end, before launching the search, the user is presented with a search form including a search bar (or field) 1 designed to collect a search parameter entered by the user and associated with a clickable button 2 making it possible to launch the search by sending the information to the associated search engine.

In accordance with the method according to this application, the search parameter entered by the user in the search bar 1 comprises a series of search elements 10, 11, 12, 13 obtained by the free addition step 15 of elements to said series by the user, the addition step 15 being able to be repeated multiple times (a limited or, preferably, unlimited number of times) until a search instruction is given.

In the case at hand, the search elements 10, 11, 12, 13 entered by the user respectively correspond to a location (the town of Megève), a date (year), photo, and expression ("snowy mountain").

Several methods exist for adding these elements to the list.

First, these elements may be identified upon entry, after each addition step, from a particular format.

Thus, for example, a location may be identified by its GPS coordinates entered using a suitable format.

It is also possible to add the location from a database inventorying different towns and locations. When the user validates the word "Megève", a preprocessing step identifying that word as corresponding to a town and the corresponding geographical element is added to the series (in this case, with an associated icon identifying the category of the added element).

It is also possible to add such a location through a drag-and-drop operation from a map.

The same is true for the date element, which may be recognized from an entry by the user using a defined format or from a calendar presented to the user on the search page.

This is also valid for photos, which may be added from their Internet address or location (URL), a preprocessing step taking care of recognizing the file format and the photo.

The photo may also be shown to the user beforehand, for example in a list. To add it to the list of elements, it is possible to use a drag-and-drop operation as for the other elements, or optionally to click on associated selection means.

It is also possible to show the user a set of themes or characteristics allowing him to initiate a search easily. The selection of such names may be made using clickable icons. The corresponding theme is then added to the list of elements.

Of course, this application is not limited to the types and categories of elements cited as an example, and it is in particular possible to apply the method to video objects, audio objects, texts, etc.

Of course, additionally, the implementation of selection means associated with an element is possible for any type of element, and not only photos.

Such selection means also make it possible to associate relevance or irrelevance information corresponding to the element to be added, and the element is added to the series with at least one corresponding relevance or irrelevance indication.

Thus, each element may be shown to the user in association with a clickable image showing a checkmark 16 and a clickable image showing an X 17.

The corresponding respective relevance or irrelevance information will then be added to the series with the considered element.

Of course, the images showing a checkmark and an X are provided as examples, and any equivalent illustration is possible, including clickable text informing the user of the choice he can make.

The relevance or irrelevance information associated with the added element is reflected in the search bar (check and X).

It is also possible to consider allowing the user to modify this indication after adding the element to the series, for example by successively clicking on the element in question added to the search bar, alternatively associated with a relevance or irrelevance indication.

In the illustrated case, the location, photo and expression elements are elements considered by the user to be relevant. The date element, on the other hand, is considered irrelevant by the user, who wishes to exclude objects from 2007.

The set of added elements is sent to the search engine when the search button 2 is clicked by the user or by any other triggering means, for example pressing on the enter key if no word has been entered.

The set of elements may be transmitted by any known means, in particular using one or more variables.

Thus, in the case where the elements are associated with relevance information, the relevant elements could be transmitted in one variable and the irrelevant elements in another variable.

Preferably, the associated search engine carries out following steps:

determining, for at least some of the elements of the series, a set of associated descriptors, based on the relevance and/or irrelevance indication of the element of the series, assigning at least one weight to all or part of the descriptors of the element, calculating a resultant of the weights associated with each descriptor of the set of elements in the list, identifying, in the database, objects associated with at least part of the descriptors of the elements of the series, initializing a relevance index for at least part of the identified objects, comparing each of said selected identified objects with the result, and for each descriptor of the compared identified objects, increasing or decreasing the relevance index of the object based on the weight of that descriptor in the resultant, returning the list of selected identified objects with their corresponding relevance indexes or in order of relevance.

Such a search method is similar to the refining method described in application WO 2012/127168.

However, it is important to note that the method described in document WO 2012/127168 targeted a method for refining result objects and required a prior search.

The present search method makes it possible to obtain optimized results directly from initial search elements.

The first step thus consists of determining a set of descriptors for the transmitted search elements.

The nature of the descriptors may depend on the category of the search element.

Thus, for keywords or phrases and expressions, the descriptors may be loaded from a dictionary or thesaurus in particular made up of plural descriptors, and may consist of homonyms, synonyms, antonyms, expressions, words with close meanings, images, sounds, videos, geographical coordinates, etc.

In the case of themes or characteristics presented to and added by the user, such a dictionary will make it possible to link said themes to a set of associated descriptors covered by that theme. The themes may thus constitute the entries of the thesaurus of the database.

The locations may give locations with descriptors of the distance type, neighboring locations, etc.

Regarding images, the descriptors may be both of a technical nature (colorimetric distribution, resolution, etc.) and be obtained using an image analysis method, or of a textual nature describing sediment. The textual descriptors may be obtained by image analysis (object recognition method, for example), but also through a photo library, containing the loaded photo associated with such descriptors. This is of course also applicable to audio files, etc., or sounds, voice, via microphone, images via webcam, etc.

The photo library may be the search database, for example.

Thus, the mountain photo given as an example, if it is known it from the database or another database (for example, an external site on which the photos are associated with "tags" or keywords), will be associated with a set of descriptors that will be recovered by the search engine.

The following steps are similar to those described in document WO 2012/127168.

First, based on the relevance and/or irrelevance indication of the element in the series, a weight is assigned to all or some of the descriptors of the considered element.

It will in particular advantageously be possible to modulate the assigned weight (negative or positive) based on the number of times the user selects the element.

Thus, in the provided example, the descriptors associated with the date will be given a negative weight, for example −P (this element having been considered irrelevant by the user).

Contrariwise, the other elements having been defined as relevant by the user, their descriptors will be given a positive weight, for example +P.

Of course, the absolute value of the weights may be different for the relevant elements and irrelevant elements.

Likewise, the values of the assigned weights may be different depending on the descriptors, and in particular decrease depending on the location of the descriptor in the list.

A resultant of the weights assigned to each descriptor is then calculated.

The objects in the database associated with at least one pair of search descriptors are then identified.

A relevance index for these objects is then initialized, for example at the value zero. Each identified object therefore has the same priority and relevance.

A subsequent step makes it possible to compare each identified object with the resultant of the weights of the descriptors.

To that end, each descriptor of the identified object is compared to the result, and the relevance indicator is increased or decreased by the weight of that descriptor in the list.

The identified objects are then reorganized based on their final relevance index, in particular from most relevant to least relevant. The identified objects may also be sorted based on the largest relevant object diversity within the perimeter of the search.

Of course, the user may next continue his search, and in particular add new elements to the search list or remove elements from it, in particular from among the identified relevant objects presented to him.

Thus, depending on whether results already exist from a previous search, the search instruction may lead to a refining method for the results from among the results previously returned, as described in document WO 2012/127168, or lead to a new search method, a complete search of course requiring more system resources.

Although the disclosure has been described with one particular example embodiment, it is of course in no way limited thereto and encompasses all technical equivalents of the described means as well as combinations thereof if they are within the scope of the disclosure.

It is in particular possible to provide additional relevant signaling means, for example a "neutral" button, in addition to means making it possible to indicate the relevance and/or irrelevance.

It is also possible to provide means for resetting the relevance weights and index in case of user error, or if the user wishes to restart refining based on other criteria.

Furthermore, although the present disclosure has been described essentially relative to photos, it is of course not limited thereto, and any other type of digital file with which descriptors can be associated may be used to carry it out. It is in particular possible to implement the method in the same way with audio files, in particular associated with descriptors regarding their musical style, type of sound, instruments, etc., as well as with video files, animated images, documents, text files, in particular scanned old books, etc.

Furthermore, different functionalities may benefit from a first search and be implemented.

Thus, for example, after a first search, the engine may automatically propose part of the descriptors and elements resulting from said search so as to subsequently be able to choose the discriminating descriptors more quickly.

What is claimed is:

1. A method for searching in a database containing at least one set of objects each linked to at least one descriptor, the search being done by a search engine from at least one request by a user in order to return at least one result object, and the request comprises at least one search parameter comprising a series of at least one search element obtained by freely adding elements to said series by the user, the addition step being able to be repeated multiple times until a search instruction is given;
wherein the element is added to the series with at least one corresponding relevance or irrelevance indication, and
wherein the search engine performs the search according to the following steps:
determining, for at least one of the elements of the series, a set of associated descriptors,
based on the relevance or irrelevance indication of the element of the series, assigning at least one weight to all or part of the descriptors of the element, and
calculating a resultant of the weights associated with each descriptor of the set of elements in the list,
and wherein the weights assigned to the descriptors of the elements considered to be irrelevant have a sign opposite that of the weights assigned to the descriptors of elements considered to be relevant.

2. The method according to claim 1 wherein the series comprises elements having a category chosen from at least one of keywords, expression, images, location, date and time.

3. The method according to claim 2, wherein a category of the element is determined during the addition of the element to said series.

4. The method according to claim 2, wherein the category is associated with said element in the series.

5. The method according to claim 2, wherein an element belonging to at least one predetermined category considered to be unauthorized is not added to the series.

6. The method according to claim 2, wherein a category of the element determined subsequently by the search engine.

7. The method according to claim 2, wherein the series comprises at least two elements having different categories.

8. The method according to claim 2, wherein the series comprises at least two elements having non-textual categories.

9. The method according to claim 1, wherein the search comprises the following additional steps:
identifying, in the database, objects associated with at least part of the descriptors of the elements of the series,
initializing a relevance index for at least part of the identified objects,
comparing each of said selected identified objects with the result, and for each descriptor of the compared identified objects, increasing or decreasing the relevance index of the object based on the weight of that descriptor in the resultant,
returning the list of selected identified objects with their corresponding relevance indexes or in order of relevance.

10. The method according to claim 1, wherein absolute values of the weights assigned to the descriptors of the elements considered to be relevant or irrelevant are equal.

11. The method according to claim 1, wherein the weight assigned to the descriptors of the elements considered to be relevant has a higher value, and in particular higher, than that of the weight assigned to the descriptors of the elements considered to be irrelevant.

12. The method according to claim 1, wherein values of the weights assigned to the descriptors of the elements considered to be relevant or irrelevant may be different from one element of the series to the next.

13. The method according to claim 1, wherein if results already exist from the previous search, the search instruction leads to a refining method for refining the results from among the results previously returned.

14. The method according to claim 1, wherein the weight assigned to the descriptors of the elements considered to be relevant has a higher absolute value, than that of the weight assigned to the descriptors of the elements considered to be irrelevant.

15. The method according to claim 1, and wherein the weights assigned to the descriptors of the elements considered to be irrelevant has a minus sign and the weights assigned to the descriptors of elements considered to be relevant is a plus sign.

* * * * *